United States Patent [19]
Bell et al.

[11] 3,789,289
[45] Jan. 29, 1974

[54] VOLTAGE LEVEL CONTROL FOR D. C.-TO-D. C. CONVERTER

[75] Inventors: David F. Bell, Woodstock; Girish C. Johari, Kingston; Edward R. McNulty, Shokan, all of N.Y.

[73] Assignee: International Business Machines Corporation, Armonk, N.Y.

[22] Filed: Mar. 31, 1972

[21] Appl. No.: 240,083

[52] U.S. Cl. .................. 321/2, 321/14, 321/45 S, 331/62, 331/117
[51] Int. Cl. ........................................ H02m 3/32
[58] Field of Search..... 321/2, 14, 18, 45 S; 331/62, 331/117

[56] References Cited
UNITED STATES PATENTS

| | | | |
|---|---|---|---|
| 3,412,311 | 11/1968 | Siedband | 321/2 |
| 3,387,228 | 6/1968 | Randall | 321/18 X |
| 3,034,073 | 5/1962 | Newell et al. | 331/117 X |
| 3,564,393 | 2/1971 | Williamson | 321/2 X |
| 3,327,199 | 6/1967 | Gardner et al. | 321/2 |
| 3,426,290 | 2/1969 | Jensen | 321/18 |
| 3,377,540 | 4/1968 | Meyer | 321/14 X |

Primary Examiner—William H. Beha, Jr.
Attorney, Agent, or Firm—Maurice H. Klitzman; James E. Murray

[57] ABSTRACT

A D.C.-to-D.C. converter that employs a current switch chopper with the collectors of two switching transistors feeding opposite ends of a primary of a step up transformer. The transformer has a secondary which resonantly feeds back voltage to the bases of the two switching transistors for converting the voltage from D.C. to A.C. and includes floating comparator means sensing the voltage at the collectors of these transistors to regulate the magnitude of the voltage by comparing that voltage with a reference voltage and then readjusting the current supplied to the floating emitters of the two switching transistors by a third transistor.

4 Claims, 3 Drawing Figures

VOLTAGE LEVEL CONTROL FOR D. C.-TO-D. C. CONVERTER

BACKGROUND OF THE INVENTION

This invention relates to D.C.-to-D.C. converters and more particularly to a scheme for regulation control of the potential of the voltage produced by such a converter.

D.C.-to-D.C. converters using a resonant transformer to convert the voltage from D.C. to A.C. and then step it up to increase the voltage are well known. However, the potential supplied by such a power supply will vary with changes in supply voltage, temperature and load. To regulate such a power supply has generally been costly, requiring heavy duty regulating circuits that carry high currents to dissipate a significant amount of heat and, therefore, is expensive and inefficient.

In copending application Ser. No. 240,084 filed on even data herewith and entitled "D.C.-To-D.C. Converter With Voltage Level Control" a new D.C-to-D.C. converter is provided that employs a chopper having the collectors of two transistors feeding opposite ends of a center tapped primary of a transformer with current from a D.C. voltage source connected between the center tap of the transformer and the emitters of the two transistors. The transformer has a secondary which resonantly feeds back voltage to the bases of the two transistors to cause the two transistors to oscillate in a class C mode of operation and thereby feed current in alternate pulses to opposite ends of the primary. The chopper includes differential sensing means for regulating the magnitude of the voltage provided by the D.C.-to-D.C. converter by sensing the voltage between the center tap and at least one end of the primary, comparing that voltage with a fixed voltage and then readjusting the current supplied to the base of a third transistor with its collector to emitter path connected in series with the D.C. voltage source.

BRIEF DESCRIPTION OF THE INVENTION

In accordance with the present invention the differential sensing circuit floats on the potential at the center tap instead of being referenced to ground potential. This permits comparisons to be made between the fixed voltage and the output voltage of the converter as reflected back through the transformer to the primary without changes in potential at the center tap of the transformer from interference with accuracy of the comparison. The output of the differential sensing circuit is then referenced to ground through a coupling circuit to provide a voltage capable of driving the third transistor.

Therefore, it is an object of the present invention to provide a new voltage regulation circuit for a D.C.-to-D.C. converter.

Other objects of the invention are to provide a D.C.-to-D.C. converter that is inexpensive and efficient and compact.

DESCRIPTION OF THE DRAWINGS

These and other objects, features and advantages of the invention will be apparent from the preferred embodiment of the invention as illustrated in the accompanying drawings, of which.

DESCRIPTION OF THE EMBODIMENT OF THE INVENTION

Figure 1A:
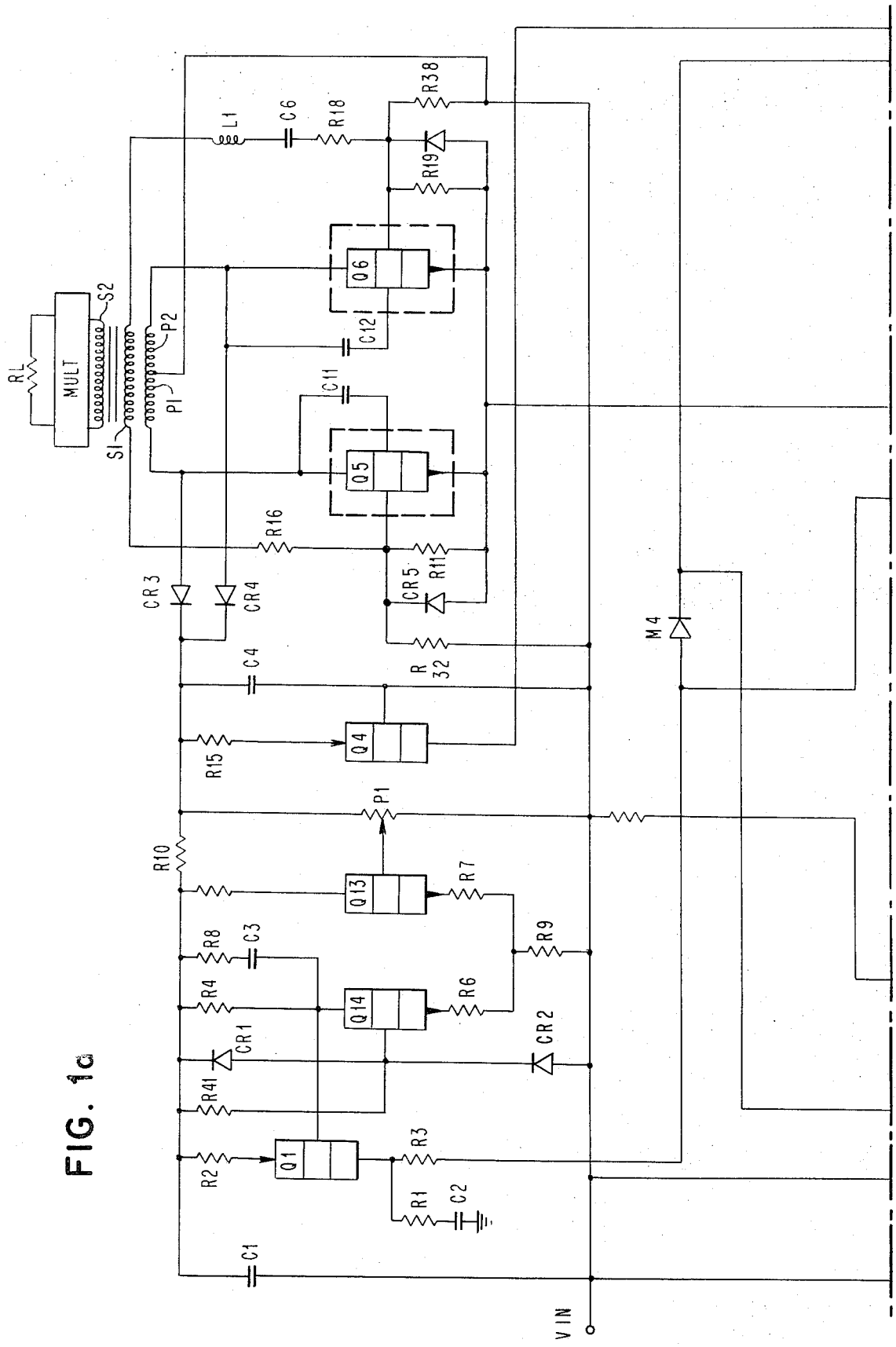
FIGS. 1a and 1b are an electrical schematic of a preferred embodiment of the invention.
Figure 1B:
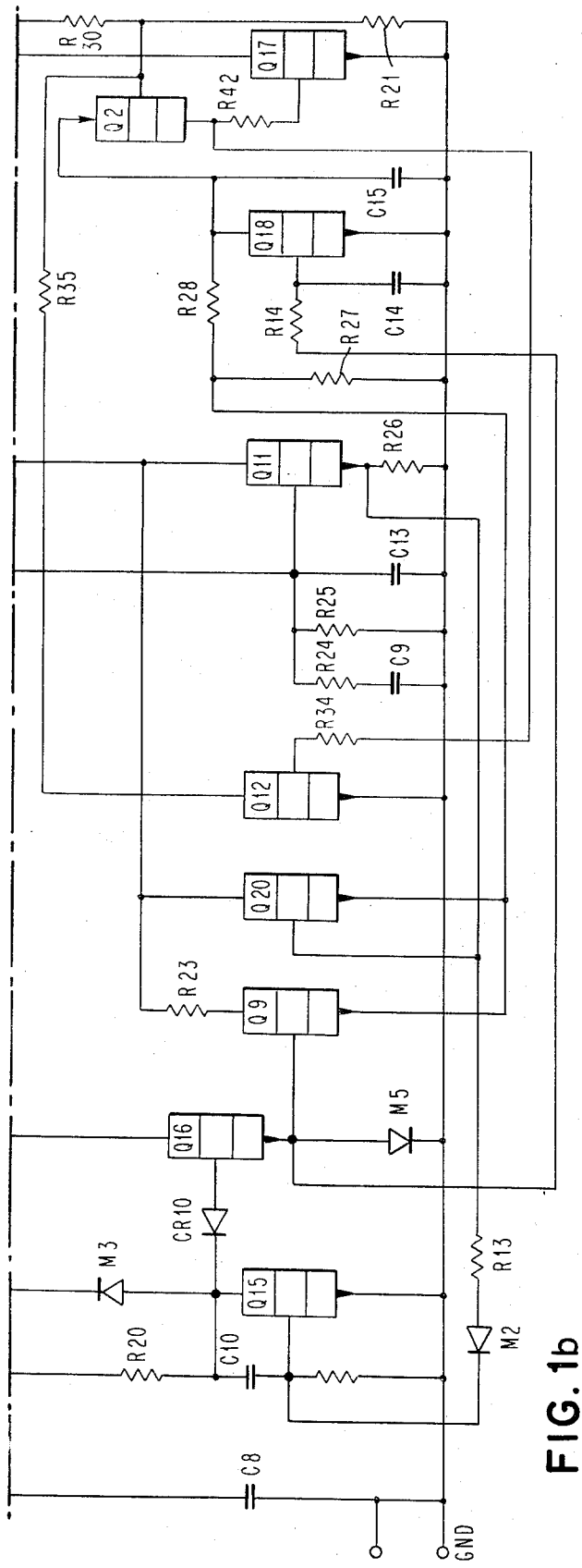

Referring to FIG. 1, transistors Q5 and Q6 are switching transistors in a current switch which is supplied current from a current source including transistor Q20. The collectors of these transistors Q5 and Q6 are connected to opposite ends of a center tap primary winding for a resonant transformer while the emitters of the two transistors are connected together to the collector of transistor Q20. Current flowing from the collector of transistor Q20 flows alternately through transistor Q5 or transistor Q6 into this primary winding. A secondary winding S1 of the transformer supplies feedback to cause the alternate conduction described. As pointed out, the transformer is a resonant transformer whose frequency of resonance is determined by the stray capacitance inherent in the transformer windings, the inductance of such windings along with the impedance of circuit elements external to the transformer windings.

Figure 2:
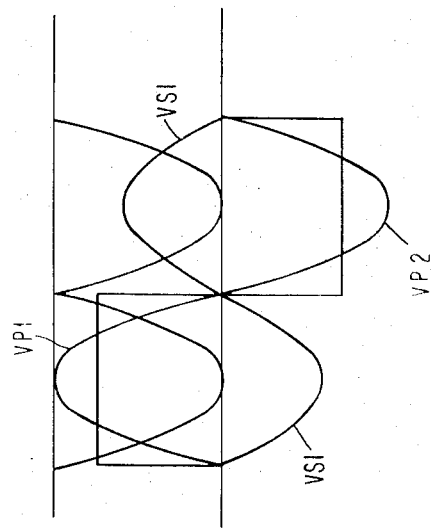
FIG. 2 are curves of the critical voltages and currents for the circuit of FIG. 1.

The secondary winding feeds the voltage back to the bases of transistors Q5 and Q6 through resistors R16 and R18, respectively. The voltage supplied to the bases is 180° out of phase with the voltage at the collectors of the transistors Q5 and Q6 with respect to the voltage at the center tap of the primary of the transformer. This arrangement is shown in FIG. 2 where the voltages VP1 and VP2 represent the voltage across the primary halves P1 and P2, respectively, while th voltage VS1 represents the voltage supplied to the bases of transistors Q5 and Q6 by the secondary S1 of the transformer through resistors R16 and R18, capacitor C6 and inductance L1. With this arrangement the circuit will oscillate providing a stepped-up voltage to the secondary winding S2 which is then fed through a voltage multiplier to further step the voltage up. The multiplier will provide a D.C. voltage to the load RL.

In accordance with the present invention, means are provided to regulate and control the voltage supplied to the load RL by controlling the current supplied to the emitters of transistors Q5 and Q6 from the collector of transistor Q20. Diodes CR3 and CR4 and capacitor C4 act as a full wave rectifier for the voltage across the primary. This voltage is fed through a divider resistor P1 to the base of transistor Q13 of the differential sense amplifier. The other transistor Q14 in this differential sense amplifier receives a reference voltage. The reference voltage is determined by the resistor R10 and zener breakdown diodes CR1 and CR2. The sense amplifier then compares the voltages at the bases of transistors Q14 and Q13 and if there is a difference it adjusts the voltage across the resistor R4 coupled to the collector of transistor Q14 as a function of these differences. It can be seen that the differential amplifier floats on the potential at the center tap of the transformer primary instead of being referenced to ground potential. This permits comparisons to be made between the fixed reference voltage and the output voltage of the converter to the primary without changes in potential at the center tap of the transformer from interfering with the accuracy of the comparison. The voltage at the collector of transistor Q14 is fed to the base of transistor Q1. Transistor Q1 controls the drive supplied to transistor Q11 through resistor R3 connecting the base of transistor Q11 to the collector of transistor Q1. Resistor R1 and capacitor C2 are to reference the voltage at the collector of transistor Q1 to ground so that the voltage is capable of driving transistor Q11. Transistor Q11 has its emitter connected to the base of transistor Q20 and its collector connected to the collector of transistor Q20 so that transistor Q11 controls the base drive to the transistor Q20. Therefore, as the voltage at the collectors of transistors Q5 and Q6 changes, the drive current for transistor Q20 is altered to bring the voltage at the collectors of transistors Q5 and Q6 back into line with the desired voltage as determined by the reference voltage at the base of transistor Q14.

Up until now we have described the steady state operation of the circuit. When potential is first applied a different mode of operation occurs. When Vin is first applied to the center tap of the primaries P1 and P2 and to the base of transistor Q6 through resistor R38, the circuit will not oscillate because there is no path to ground from the emitters of transistors Q5 and Q6. Transistors Q9, Q11 and Q20, which would normally provide such a path, are biased off. Diode CR10 conducts in a forward direction through conducting transistor Q15 clamping the base of transistor Q16 to ground to hold transistor Q9 off and, as shall be seen hereafter, transistors Q11 and Q20 require operation of the oscillator before they conduct. However, as times goes on, capacitor C10, which is initially uncharged, charges allowing the collector of transistor Q15, and therefore the plate of diode CR10, to rise causing the diode CR10 to become reverse biased and operate in the zener diode mode to supply base drive to transistor Q16. Transistor Q16, therefore, goes on and supplies base drive to transistor Q9 causing transistor Q9 to conduct. With transistor Q9 conducting a path to ground for a low level starting current is provided for the switching transistors Q5 and Q6 through transistors Q9 and resistors 23 and 27. This starts the circuit oscillation and with oscillation an A.C. voltage is generated across the primary of the transformer. This voltage is rectified and supplied to transistors Q14 and Q13 providing a voltage drop across resistor R4 that turns on transistor Q1. The collector current of transistor Q1 is then supplied through resistor R3 to the base of transistor Q11 turning transistor Q11 on slowly as the A.C. voltage across the primary rises. As transistor Q11 goes on it supplies base current to transistor Q20 which then shunts the resistor R23 and transistor Q9 to provide a high current path to ground for the drive current for transistors Q5 and Q6.

The overcurrent trip circuit, whic will be described next, prevents burning out the driver transistors Q5 and Q6 when the circuit is fully operational. As the current through transistors Q5 and Q6 increases, the control current passing through transistor Q20 to ground generates a voltage across resistor R27. The voltage across resistor R27 charges capacitor C15 which controls the emitter voltage of transistor Q2. The base voltage of transistor Q2 is determined by a divider network that receives its power from transistor Q4. The conduction of transistor Q4 is governed by the level on its base. This level is provided by capacitor C4 which is charged by diodes CR4 and CR3 from the transformer primary. Therefore, conduction of transistor Q2 will depend on both the voltage level at the transformer primary and the current level through the transistor Q20. When transistor Q2 does condut it provides base drive to transistor Q17 turning on transistor Q17. When transistor Q17 conducts, it discharges capacitor C10 through diode M3 resetting the circuit to the beginning of start conduction so that the initial operation described above has to reoccur before the circuit is again operating under full power. Transistor Q18 prevents the operation of the overcurrent trip circuit during the initial operating cycle when transistor Q18 is maintained conducting to clamp the emitter of transistor Q2 to prevent transistor Q2 from conducting and causing transistor Q17 to discharge capacitor C10.

Therefore, it should be understood by those skilled in the art that various changes in form and details may be made therein without departing from the spirit and scope of the invention.

What is claimed is:

1. A D.C.-to-D.C. converter for receiving an input voltage at one potential from a two terminal source of input voltage and supplying an output voltage at another potential comprising:

a resonant transformer having a center tapped primary winding coupled to one terminal of the source of input potential and at least one secondary winding;

a current switch with three transistors, two of the transistors being switching transistors with their collectors connected to opposite ends of the center tapped primary winding to supply current to the primary winding, their emitters coupled together and floating with respect to both terminals of said sources of input voltage and their bases being coupled to the mentioned secondary winding to receive voltages therefrom and cause the two switching transistors to operate in class C mode of operation and the third transistor serving as a current source for the two switching transistors with its collector connected to the emitters of the two switching transistors and its emitter coupled to the other terminal of the source of the input voltage so that said other terminal functions as a ground terminal for the D.C.-to-D.C. converter; and control means for regulating the output voltage of the converter including:

differential sensing means floating on the potential at the center tap of the transformer for comparing the voltage between the center tap and at least one end of the primary winding to a fixed voltage and for providing an output voltage indicative of the difference in potential between the two compared voltages; and control transistor means coupling the output of the differential amplifier to the base of the third transistor to control the magnitude of the current through the third transistor as a function of said output, said control transistor means including means for referencing the output voltage of said differential amplifier to ground potential for the D.C.-to-D.C. converter.

2. The D.C.-to-D.C. converter of claim 1 wherein said differential sensing means includes full wave rectifying means for rectifying the voltage across both halves of the center tapped primary and providing a D.C. voltage indicative of voltage across both halves;

a differential amplifier means having two transistors with their emitters coupled together and a D.C. current source connected in series with the collector to emitter paths of both the transistors across the output of said rectifying means;

voltage divider means connected across the output of said rectifying means and to the base of one of the transistors in the differential amplifier for providing an input signal to said differential amplifier;

zener diode means coupled across the output of the rectifying means and to the base of the other of the transistors in the differential amplifier to provide the fixed voltage to the emitter of the other transistor in the differential amplifier means; and output means at the collector of the other transistor in the differential amplifier for providing said output voltage of the differential sensing means.

3. The D.C.-to-D.C. converter of claim 2 including:

a high impedance current source in shunt with the third transistor; and means for operating the high impedance current source when voltage is initially applied by the voltage source.

4. The D.C.-to-D.C. converter of claim 3 including:

means for switching off said third transistor when current through said third transistor exceeds a desired maximum.

* * * * *